United States Patent Office 2,840,561
Patented June 24, 1958

2,840,561

N-(AMINOALKYL)-N,N'-ALKYLENEUREAS AND METHODS OF PRODUCING THEM

Robert S. Yost, Oreland, Pa., assignor to Rohm & Haas Company, Philadelphia, Pa., a corporation of Delaware No Drawing. Application September 9, 1955
Serial No. 533,510

7 Claims. (Cl. 260—256.4)

This invention is concerned with novel N-(aminoalkyl)-N,N'-alkyleneureas, and methods of producing them. It is particularly concerned with such novel compounds in which the nitrogen atom in the side chain has at least one hydrocarbon substituent and one of the nitrogen atoms in the ring is attached to a hydrogen atom.

The novel compounds of the present invention have the structure of the general Formula I:

I 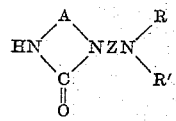

where A is an alkylene group having 2 to 3 carbon atoms of which at least two extend in a chain between the adjoined N atoms, Z is an alkylene group having 2 to 18 carbon atoms of which at least two extend in a chain between the N atoms, R, when not directly attached to R', is selected from the group consisting of H, phenyl, benzyl, cyclohexyl, and alkyl and alkenyl groups having from 1 to 18 carbon atoms, R', when not directly attached to R, is selected from the group consisting of phenyl, benzyl, cyclohexyl, and alkyl and alkenyl groups having from 1 to 18 carbon atoms, and R and R', when attached directly together, form a heterocyclic ring with the adjoining N atom of the formula and are selected from the group consisting of the morpholino residue =(CH$_2$CH$_2$)$_2$O, the piperidino residue —(CH$_2$)$_5$— and the pyrrolidino residue —(CH$_2$)$_4$—.

These compounds may be made by reacting a primary or secondary amine with certain new compounds which I have recently discovered having the Formula II:

II 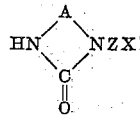

where X is a halogen selected from the group consisting of chlorine and bromine.

Examples of amines of primary and secondary type, which may be reacted with a compound of Formula II to produce the compounds of the present invention, include: methylamine, dimethylamine, ethylamine, diethylamine, propylamine, isopropylamine, n-butylamine, di-(n-butyl)amine, sec-butylamine, di-(sec-butyl)-amine, amylamine, hexylamine, cyclohexylamine, dicyclohexylamine, phenylamine, diphenylamine, benzylamine, dibenzylamine, methylbenzylamine, methylphenylamine, methylethylamine, ethylbenzylamine, n-octylamine, di-(n-octyl)amine, laurylamine, 2-dodecenylamine, hexadecylamine, octadecylamine, di-(octadecyl)amine, morpholine, piperidine, pyrrolidine.

The compounds of Formula II may be made in the manner described and claimed in my copending application, Serial No. 500,300, filed on April 8, 1955, and involves the reaction of thionyl halides of the Formula III with a compound of Formula IV:

III    SOX

IV 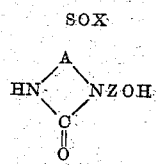

where X, A, and Z are as defined above. The thionyl halide and the compound of Formula IV may be used in approximately equimolar amounts and the reaction is preferably effected in a solution of the compound of Formula IV, such as in chloroform. Preferably the thionyl halide is added gradually. For example, when the reaction involves a batch containing about two moles of a compound of Formula IV, the thionyl halide may be added over a period of two hours. Reaction is preferably effected at a temperature of 30° to 100° C. Advantageously, it may be carried out with the solvent at reflux, in the case of chloroform, refluxing occurring at a temperature of about 58° to 66° C. After completion of the addition of the thionyl halide, the solvent, such as the chloroform, may be gradually distilled while introducing toluene until the temperature in the vessel reaches about 105° to 109° C. It is then refluxed for about 20 hours in the toluene. The product of Formula II is usually soluble in the hot toluene which is cooled to about 5° to 10° C. or lower to precipitate the compound of Formula II. The precipitated product may then be filtered and, if desired, washed with cold toluene. It is then air-dried or dried under a vacuum at room temperature. Instead of chloroform, other solvents, such as carbon tetrachloride and ethylene dichloride, may be used; and in place of toluene, other non-polar solvents, such as benzene, xylene, or the like may be used.

The compounds of Formula IV may be made in various ways described in a copending application, Serial No. 348,105, filed April 10, 1952, now Patent No. 2,727,019, in the hands of a common assignee. For example, as there disclosed, urea may be condensed with a hydroxyalkylaminoalkylamine, such as any one of the following:

V(a)  HOCH$_2$CH$_2$NHCH$_2$CH$_2$NH$_2$
V(b)  HOCH$_2$CH$_2$NHCH$_2$CH$_2$CH$_2$NH$_2$
V(c)  HOCH$_2$CH$_2$NHCH(CH$_3$)CH$_2$NH$_2$
V(d)  HOCH(CH$_3$)CH$_2$NHCH$_2$CH$_2$NH$_2$
V(e)  HOCH(CH$_3$)CH$_2$NHCH$_2$CH$_2$CH$_2$NH$_2$
V(f)  HOCH$_2$CH$_2$CH$_2$NHCH$_2$CH$_2$NH$_2$
V(g)  HOCH$_2$CH$_2$CH$_2$NHCH(CH$_3$)CH$_2$NH$_2$
V(h)  HO(CH$_2$)$_4$NHCH$_2$CH$_2$NH$_2$
V(i)  HO(CH$_2$)$_5$NHCH$_2$CH$_2$CH$_2$NH$_2$
V(j)  HO(CH$_2$)$_{10}$NHCH$_2$CH$_2$NH$_2$
V(k)  HOCH(C$_6$H$_5$)CH$_2$NHCH$_2$CH$_2$NH$_2$
V(l)  HOCH(C$_6$H$_5$)CH$_2$NHCH(CH$_3$)CH$_2$NH$_2$
V(m)  HOCH(CH=CH$_2$)CH$_2$NHCH$_2$CH$_2$NH$_2$
V(n)  HOCH(CH=CH$_2$)CH$_2$NHCH(CH$_3$)CH$_2$NH$_2$
V(o)  HOCH(C$_6$H$_{13}$)CH$_2$NHCH$_2$CH$_2$NH$_2$
V(p)  HOCH(C$_8$H$_{17}$)CH$_2$NHCH(CH$_3$)CH$_2$NH$_2$
V(q)  HOCH(C$_{16}$H$_{33}$)CH$_2$NHCH$_2$CH$_2$NH$_2$
V(r)

HO—HC⟨CH$_2$—CH$_2$⟩CH—NHCH$_2$CH$_2$NH$_2$
      CH$_2$—CH$_2$

The reaction with urea may be effected by mixing one of the above hydroxy-diamines with an approximately equi-molecular weight of urea and heating the mixture at sufficient temperature to evolve ammonia. Generally, temperatures may be between 200° to 210° C. Usually the reaction runs in two temperature ranges, initial evolution of ammonia occurring at 110° to 150° C., and the completion of the evolution of ammonia being effected at temperatures of 150° to 200° C.

The reaction of the primary or secondary amine with a compound of Formula II to produce the new compounds of Formula I may be effected without a solvent, but is preferably effected in a solvent, such as benzene, toluene, xylenes, water, or alcohols, such as ethanol, isopropanol, butanol, and so on. Generally, from 2 to 3 moles of the amine is used to each mole of the compound of Formula II so that excess amine is available to take up the hydrogen chloride or hydrogen bromide liberated. Instead of having an excess of the amine reactant to accept the hydrohalide developed, there may be used at least one equivalent of a tertiary amine, such as trimethylamine, triethylamine, or the like, or of an alkali metal carbonate, such as sodium or potassium carbonate or bicarbonate, the carbonates being particularly useful when a non-volatile amine reactant is involved, for each mole of the compound of Formula II reacted for the purpose of accepting the hydrohalide developed. The temperature of reaction may be from room temperature for a period of 24 to 48 hours or more up to about 200° C. for periods of 15 minutes or so. When a volatile amine is used, such as monomethylamine, an autoclave may be employed to facilitate the retention of the amine within the reaction medium at elevated temperatures. When a volatile amine is used, as mentioned before, a pressure of 20 to 100 pounds per square inch gage may be developed, such as at a reaction temperature of 100° C. The product may be isolated by filtering off the hydrochloride salt or hydrobromide salt of the amine reactant when such salt is insoluble and leaving the salt of the product amine in solution. Then solvent is distilled off and the product is distilled at low pressures on the order of 1 to 2 mm. Hg. If no insoluble amine salt is produced in the reaction, isolation may be effected by the addition of an alkaline material, such as sodium methoxide, to precipitate sodium chloride or sodium bromide and liberate the free amines. The salt is then filtered off and the amines are fractionally distilled to produce the product.

Examples of the new compounds of Formula I include: 1-($\beta$-methylaminoethyl)imidazolidinone-2; 1-($\beta$-dimethylaminoethyl)-imidazolidinone-2; 1-($\beta$-ethylaminoethyl)-imidazolidinone-2; 1-($\beta$-diethylaminoethyl-imidazolidinone-2; 1-($\beta$-diisopropylaminoethyl)imidazolidinone-2; 1-($\beta$-butylaminoethyl)imidazolidinone-2; 1-($\beta$-octadecylaminoethyl)imidazolidinone-2; 1-($\beta$-morpholinoethyl)-imidazolidinone-2; 1-($\beta$-piperidinoethyl)imidazolidinone-2; 1-($\beta$-pyrrolidinoethyl)imidazolidinone-2; 1-($\gamma$-dimethylaminopropyl)imidazolidinone-2; 1-($\beta$-diethylaminopropyl)imidazolidinone-2; 1-($\beta$-dimethylaminoethyl)-5-methyl-imidazolidinone-2; 1-($\gamma$-dimethylaminopropyl)-5-methyl-imidazolidinone-2; 1-(4-dimethylaminobutyl)imidazolidinone-2; 1-(10-dimethylaminodecyl)imidazolidinone-2; 1-($\beta$-ethylamino)decyl-5-methyl-imidazolidinone-2; 1-($\beta$-methylaminoethyl)-tetrahydro-pyrimidinone-2; 1-($\beta$-diethylaminoethyl)-tetrahydro-pyrimidinone-2; 1-($\beta$-dicyclohexylaminoethyl)-tetrahydro-pyrimidinone-2; 1-($\beta$-(isopropylamino)propyl)-tetrahydro-pyrimidinone-2; 1-(5-butylaminopentyl)-tetrahydro-pyrimidinone-2; 1-(5-hexadecylaminopentyl)-tetrahydro-pyrimidinone-2; 1-($\beta$-morpholinoethyl)-tetrahydro-pyrimidinone-2; and 1-($\beta$-(methylbenzylamino)propyl)-tetrahydro-pyrimidinone-2.

Preferred compounds of the present invention are those of Formula I, in which A and Z are ethylene, R is hydrogen or a lower alkyl of 1 to 4 carbon atoms, and R' is a lower alkyl having 1 to 4 carbon atoms.

The compounds of the present invention having the structure of Formula I are generally high-boiling liquids to solids of various melting points. They are generally soluble in water and alcohols, such as methanol, ethanol, and isopropanol when the carbon atom size of the substituents Z, R, and R' is not excessively long, that is generally not over 4 to 6 carbon atoms in size. All of the compounds including both the lower and higher molecular weight compounds of Formula I are soluble in benzene, toluene, xylenes, chloroform, carbon tetrachloride, dimethylformamide, dimethylacetamide, and generally also in ethyl acetate, ether, acetone, dioxane, and the nitro-paraffins, including especially nitroethane.

The new compounds of Formula I are useful as corrosion inhibitors for automobile antifreezes. They are also useful corrosion inhibitors in steam generating systems for which purpose they may be introduced into the feed water for the boiler and may be selected to steam distill during operation of the boiler so as to protect the return lines. The new compounds may also be introduced as modifiers of aminoplast types of thermosetting resin-forming condensates, such as those of urea-formaldehyde, melamine formaldehyde and the like. The modified aminoplasts may be used for increasing the wet strength of paper, for the treatment of textiles, especially those of cellulosic types including cotton and rayon, to condition them for various purposes. For example, the compounds having long chain hydrophobic groups for the substituents R and R' and also Z may be used to impart water-repellency and to serve as lubricants. Certain of the compounds having proper balance between hydrophobic and hydrophilic ends in the molecule show surface activity and may be used as dispersing agents and as detergent agents or auxiliaries. The incorporation of 1% to 8% of a compound of Formula I in spinning solutions of cellulose esters, such as cellulose acetate in acetone, the percentage being based on the weight of cellulose ester, serves to inhibit gas fading of the fibers, filaments, or other structures made from the solutions when they are dyed.

Those compounds of Formula I in which R is a hydrogen atom have two nitrogen atoms carrying reactive hydrogen and are adapted to react with various agents and particularly aldehydes. Thus, they may be methylolated with formaldehyde and the products thereby obtained serve to cross-link materials containing hydroxyl or primary or secondary amide or amino groups. For example, reaction of the methylolated compounds with nylon, wool, or casein fibers, or with cellulosic materials such as fibers, yarns, or fabrics of rayon or cotton serve to reduce shrinkage and imparts crease-resistance as well as reduced moisture pick-up or regain. The presence of the hydrogen atom on one of the ring nitrogen atoms and the presence of a single hydrogen atom on the side chain nitrogen prevents the production of trimers when the compounds of the present invention are reacted with formaldehyde, which trimers on subsequent reaction, as with the hydroxyl groups of cellulose, apparently form relatively unstable cross-links as compared to the cross-links obtained with the dimethylol compounds of the present invention.

A preferred group of the compounds of the present invention are those in which R is not hydrogen. Of this group, those in which R and R' are alkyl groups having 6 to 18 carbon atoms are useful as oil additives to lower the pour point, to reduce corrosion and to generally improve the oil characteristics, such as viscosity and so on. The compounds in which R is other than hydrogen may be reacted with aldehydes and especially formaldehyde to produce derivatives which are capable of reaction with nylon, wool, casein fibers and fabrics, or with cellulosic materials, such as cellophane, cotton, or rayon, to modify hand, stiffness, water-repellency and so on. Water-repellency may be best obtained, in this way, when R and/or R' and/or Z in the compounds of Formula I are of long carbon chain length, such as from 8 to 18 carbon atoms, the greatest effect being obtained when all three are of such long chain lengths.

The compounds of the present invention in which R is other than hydrogen are also highly useful for the production of quaternary ammonium compounds which serve as: agents for treating and conditioning textiles, including surface-active agents for wetting and cleaning such textiles; lubricating and softening agents to be applied to various materials, especially of cellulosic type, such as fibers and yarns of cellulose esters, especially cellulose acetate, or of rayon, as well as to films of regenerated cellulose; antistatic agents for application to articles made of hydrophobic materials, such as fibers, films, yarns, textile fabrics, and other shaped articles formed of vinyl resins, such as polyvinyl chloride, polyvinylidene chloride, polyacrylonitrile, copolymers of vinyl chloride, vinylidene chloride, and acrylonitrile with each other or with other comonomers including vinyl pyridines, vinyl acetate, methyl acrylate, other acrylates or methacrylates, also nylons and polyesters, such as polyethylene terephthalate. These quaternary ammonium compounds are readily made directly from a compound of Formula I in which R is other than hydrogen by reacting it with an alkylating agent such as methyl chloride, ethyl chloride, benzyl chloride, allyl chloride, substituted allyl chloride, e. g., dodecylallyl chloride, dodecenyl chlorides, alkylbenzyl chlorides, e. g., octylbenzyl chlorides (from diisobutylene), any chloromethylated aromatic-like compound, e. g., chlorobenzyl chloride, chloromethylated thiophene, chloromethylated furane, chloromethylated naphthalene, or corresponding bromides or iodides, e. g., phenoxyethyl bromide, methyl iodide; dimethyl sulfate, dimethyl sulfite, dimethyl phosphite, ethylene oxide, propylene oxide, styrene oxide, and butylene oxide. The quaternization may be effected in a solvent, such as a lower alcohol, e. g., methanol, ethanol, isopropanol. Generally the reaction may be effected at a temperature between 50° and 120° C., preferably between 70° and 90° C., and conveniently at the temperature of reflux or boiling of the solvent used. The product may be recovered by distilling off the solvent, at atmospheric pressure or in vacuo. The quaternaries can also be made by progressively alkylating a compound of Formula I in which R is hydrogen.

All of the compounds of the present invention (Formula I) have been found to react with acetylene as disclosed in my copending application Serial No. 533,511, filed on even date herewith, wherein the new vinyl derivatives obtained are claimed. It has been found that the presence of the hydrogen atom on the ring nitrogen is essential for this purpose. In this connection, the compounds of the present invention in which R is other than hydrogen are preferred because of the wide range of copolymers that can be made from them, whereas the vinyl derivatives obtained from compounds the same as those of Formula I herein except that one or both of R and R' is or are hydrogen react in other ways, such as by a 1,4 addition mechanism or by aminolysis with many available monoethylenically unsaturated monomers, such as the esters, amides, acids, and nitriles of unsaturated acids, including acrylic, methacrylic, etc. acids.

In the following examples, which are illustrative of the invention, the parts given are by weight unless otherwise indicated.

*Example A*

In a reaction vessel fitted with mechanical stirrer, thermometer, dropping funnel and reflux condenser are placed 260 parts of N-(β-hydroxyethyl)N,N'-ethyleneurea (obtained from the condensation of urea with the compound of Formula V(a) above) and 600 parts of anhydrous chloroform. The mixture is heated to reflux and 238 parts of purified thionyl chloride is added dropwise over a period of two hours. Reflux is maintained by the heat of reaction for most of this period. The chloroform is then distilled out of the mixture while 348 parts of anhydrous toluene is added at approximately the same rate at which the chloroform is distilled. Distillation is continued until the vapor temperature reaches 110° C. The mixture is refluxed for sixteen hours and then is chilled in an ice bath. The product precipitates and is filtered, washed with cold toluene, and dried at 60° C. to give 268 parts (a 90% yield of N-(β-chloroethyl)-N,N'-ethyleneurea, M. P. 81.5° to 82° C. One recrystallization from toluene gives a colorless, crystalline product melting at 84.0° to 85.0° C.

*Analysis.*—Calculated for $C_5H_9ON_2Cl$: C, 40.41%; H, 6.11%; N, 18.86%; Cl, 23.86%. Found: C, 40.62%; H, 6.05%; N, 18.90%; Cl, 23.26%.

*Example B*

The procedure of Example A is repeated substituting 316 parts of N-(γ-hydroxypropyl)-N,N'-trimethyleneurea for the urea derivative there used. N-(γ-chloropropyl)-N,N'-trimethyleneurea is the product obtained.

*Example C*

An 88% yield of 1-(β-chloropropyl)-5-methyl-imidazolidinone-2 is obtained by repeating the process of Example A substituting 316 parts of 1-(β-hydroxypropyl)-5-methyl-imidazolidinone-2 for the urea derivative therein used.

*Example D*

The following chloroalkyl cyclic ureas are obtained by repeating the process of Example A with substitution for the hydroxyalkylurea used therein an equivalent molar quantity of the hydroxyalkyl cyclic urea obtained by condensation of urea with the N-hydroxyalkylalkylenediamine of the formula given after the name of the product compound:

(a) 1 - (β-chloroethyl)-tetrahydro-pyrimidinone-2 (from V(b)).
(b) 1 - (γ - chloropropyl) - 5 - methyl-imidazolidinone - 2 (from V(g)).
(c) 1 - (4-chlorobutyl)-imidazolidinone-2 (from V(h)).
(d) 1 - (10-chlorodecyl)imidazolidinone-2 (from V(j)).
(e) 1 - (β - chlorodecyl) - 5 - methyl - imidazolidinone - 2 (from V(p)).

*Example 1*

(a) A stainless-steel autoclave is charged with 89 parts of 1-(β-chloroethyl)-imidazolidinone-2, 530 parts of benzene, and 81 parts of liquid anhydrous dimethylamine. The autoclave is sealed and the reaction mixture is stirred and heated at 100°–105° C. for six hours during which time the pressure reaches a maximum of 40 p. s. i. and then drops so that, at the end of the heating period, the pressure is 22 p. s. i. The reaction mixture is filtered to remove dimethylamine hydrochloride (47 parts) after which the filtrate is concentrated under reduced pressure. The product is distilled to yield 74 parts of 1-(β-dimethylaminoethyl)-imidazolidinone-2 boiling in the range 130°–146° C. at 1 mm. of mercury. The product crystallizes on standing at room temperature. Melting point (crude): 51°–53° C.

A sample of the product is converted to the hydrochloride by precipitation from methanol with anhydrous hydrogen chloride. The salt after recrystallization from methanol melts at 202.5°–203.0° C.

*Analysis.*—Calculated for $C_7H_{16}ON_3Cl$: Cl, 18.3%. Found: Cl, 18.0%.

(b) The procedure of part (a) is repeated substituting 106 parts of N-(γ-chloropropyl)-N,N'-trimethyleneurea for the imidazolidinone of part (a). There is obtained a solid product, 1-(γ-dimethylaminopropyl)-tetrahydropyrimidinone-2.

(c) The solid product, 1-(γ-dimethylaminopropyl)-5-methyl-imidazolidinone-2 is obtained by repeating part (a) substituting for the imidazolidinone there used 106 parts of 1-(γ-chloropropyl)-5-methyl-imidazolidinone-2.

The products of parts (a), (b), and (c) are corrosion inhibitors useful in glycol antifreezes for automobiles at concentrations of 0.1 to 1.5% by weight of the solution.

*Example 2*

(a) The procedure of Example 1(a) is repeated in a glass vessel equipped with an agitator and reflux condenser, the amine being replaced with 110 parts of dicyclohexylamine and 50 parts of potassium carbonate. The solid product is 1-(β-dicyclohexylaminoethyl)-imidazolidinone-2.

(b) Similarly 1-(β-diocetadecylaminoethyl)-imidazolidinone-2 is obtained when the 110 parts of dicyclohexylamine is replaced with 312 parts of dioctadecylamine.

(c) By proceeding in part (a) but replacing the amine with 77.4 parts of dibutylamine and the imidazolidinone with 165 parts of 1-(β-chlorodecyl)-5-methyl-imidazolidinone (of Example D(e)), a solid product consisting of 1-(β-dibutylaminodecyl)-5-methyl-imidazolidinone-2 is obtained.

(d) Part (c) is repeated except that the imidazolidinone is replaced with 1-(10-chlorodecyl)-imidazolidinone-2 (of Example D(d)) and 1-(10-dibutylaminodecyl)-imidazolidinone-2 is obtained.

The products of parts (a) through (d) hereof are useful as water-repellent coating materials. Application to leather by rubbing or by aqueous emulsions serves to render the leather highly water-repellent.

*Example 3*

(a) There are charged to a reaction vessel 148.5 parts of 1-(β-chloroethyl)-imidazolidinone-2 and 775 parts of 40% aqueous monomethylamine. The mixture is stirred at room temperature for thirty hours. At the end of this period, a titration for chloride ion shows the reaction to be essentially complete. After adding 40 parts of sodium hydroxide dissolved in about 60 parts of water, the water in the mixture is removed by distillation in vacuo. When virtually all of the water is distilled, 300 parts of benzene is added and the mixture is distilled until the distillate appears to contain no water. The resulting mixture is filtered to remove sodium chloride (59 parts), the filtrate is concentrated in vacuo, and the residue is distilled to yield a product consisting of 98.5 parts of 1-(β-methylaminoethyl)-imidazolidinone-2 boiling at 145°–150° C. at 0.5 mm. of mercury.

A sample of the product is converted to the hydrochloride by precipitation from methanol with anhydrous hydrogen chloride. The salt is recrystallized from a water-isopropanol mixture to give the purified product melting at 194.0°–194.5° C.

*Analysis.*—Calculated for $C_6H_{14}ON_3Cl$: Cl, 19.7%. Found: Cl, 19.5%.

(b) The procedure of part (a) is repeated, replacing the imidazolidinone with 1-(β-chloroethyl)-tetrahydropyrimidinone-2. The solid product obtained is 1-(β-methylaminoethyl)-tetrahydropyrimidinone-2.

When 1% by weight of the compounds of parts (a) and (b) are introduced into boiler feedwater, corrosion in the return lines is reduced considerably.

*Example 4*

The procedure of Example 3(a) is repeated replacing the amine with 1350 parts of a 33% solution of monoethylamine. The product is 1-(β-ethylaminoethyl)-imidazolidinone-2.

It is to be understood that changes and variations may be made without departing from the spirit and scope of the invention as defined in the appended claims.

I claim:

1. A method which comprises reacting at a temperature from room temperature to 200° C. an amine of the formula HNRR' with a compound of the formula

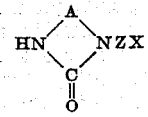

where A is an alkylene group having 2 to 3 carbon atoms of which at least two extend in a chain between the adjoined N atoms, Z is an alkylene group having 2 to 18 carbon atoms of which at least two extend in a chain between the N and X atoms, R is selected from the group consisting of H, cyclohexyl, and alkyl groups having from 1 to 18 carbon atoms, R' is selected from the group consisting of cyclohexyl and alkyl groups having from 1 to 8 carbon atoms, and X is a halogen selected from the group consisting of chlorine and bromine; and recovering an N-(aminoalkyl)-N,N'-alkyleneurea from the reaction medium.

2. A process as defined in claim 1 in which the time of reaction is from 15 minutes at the higher portion of the temperature range to 24 to 48 hours or so at the lower portion thereof.

3. A process as defined in claim 1 in which the reaction is effected while the reactants are in solution in an organic solvent and excess amine is used.

4. A process as defined in claim 3 in which the solvent used is an aromatic hydrocarbon solvent selected from the group consisting of benzene, toluene, and xylene.

5. A process as defined in claim 3 in which the solvent used is an alcohol.

6. A process as defined in claim 3 in which an aqueous solvent is used as the reaction medium.

7. A process as defined in claim 1 in which the reaction is effected while the reactants are in solution in an organic solvent and a tertiary amine is used to take up the hydrohalide liberated by the reaction.

References Cited in the file of this patent
UNITED STATES PATENTS
2,613,212    Hurwitz et al. _____ Oct. 7, 1952

UNITED STATES PATENT OFFICE
CERTIFICATE OF CORRECTION

Patent No. 2,840,561

June 24, 1958

Robert S. Yost

It is hereby certified that error appears in the printed specification of the above numbered patent requiring correction and that the said Letters Patent should read as corrected below.

Column 8, lines 32 and 33, claim 1, for "alkyl groups having from 1 to 8 carbon atoms, read -- alkyl groups having from 1 to 18 carbon atoms --.

Signed and sealed this 19th day of August 1958.

(SEAL)
Attest:

KARL H. AXLINE
Attesting Officer

ROBERT C. WATSON
Commissioner of Patents